Patented May 10, 1949

2,469,645

UNITED STATES PATENT OFFICE 2,469,645

ELECTRIC DEMAND CONTROLLER

Howard W. Harper, Bridgeport, Conn.

Application March 4, 1944, Serial No. 525,064

28 Claims. (Cl. 171—97)

This invention relates to demand regulating systems, and more particularly to such a system in which there is automatic electrical-load regulating means for preventing excess demand according to a predetermined plan.

Users of commercially supplied energy, such as electricity, frequently contract with the suppliers at rates based on minimum and maximum demands over a given period of time. Under this arrangement it is most economical for a user to hold his maximum demand to the lowest possible value, since for an abnormally high value in any period he is subjected to an additional charge computed over the entire period. Where a large amount of power-driven equipment, some idle part of the time, is involved, the problem of keeping the demand below a specified maximum for each period becomes quite difficult, and it is further aggravated if energy consuming devices which have a highly variable consumption rate are in use.

The maintenance of the load within the maximum set is of such economic importance as to justify, in many cases, the assignment of a man to the duty of constantly watching the situation and cutting out loads which are dispensible should there be danger that the maximum load would be exceeded.

An object of the present invention is to provide an improved regulating system which automatically controls a consumers loading so that regardless of peaks therein or wide variations thereof, his demand does not exceed the stipulated maxmum value over any period of reckoning, and which system may be calibrated, and conveniently adjusted while in operation to meet special conditions of loading as they arise.

This is accomplished by a novel organization, in combination with load control means, of integrating means responsive to load, integrating means responsive to time, and circuit means for varying the relationship, between the integrating means, which causes the load control to function. In the embodiment of the invention illustrated herein as exemplary thereof, the system is adapted for use with a contact-making kilowatt-hour meter, and the integrating means comprise powered selector switches which have contactors advanced in response to the load, and to the elapse of time. The switches automatically complete a cycle within a predetermined time interval, and the contacts thereof are coupled to unloading means to control the same according to a predetermined plan. Preferably, although not essentially, the plan may be varied from time to time. Accordingly, a master coupling switch may be provided which variably couples the selector switches and may be set to cause operation of the load control means for any of a plurality of predetermined ratios of energy to elapsed time between the integrating means.

Another feature of the invention is the provision of an improved regulating system wherein by simply adjusting a switch or the like the maximum permissible demand may be conveniently changed to any value upon which rates are to be based, so that the system is universal to meet the needs of the consumer.

This is accomplished according to the present invention by extending, or reducing, the range of the load integrating means and apportioning the new maximum load over the reckoning time.

In the embodiment shown this is done by the provision of circuit means controlled by a reset control switch whereby the initial or reset position of the integrating switch responding to load may be changed to any of a plurality of settings, thus altering correspondingly the integrated load values entering into the relationship wtih the time integrating selector switch.

Another feature of this invention is the provision of a doubler switch in combination with a pair of relays so that if the kilowatt-hour meter with which the system is used has a plurality of contacts, advantage may be taken of this to use one or both of said contacts to cover double the range of predetermined demand values provided by the reset control switch.

Still further intermediate values are obtained through the use of an auxiliary switch-controlled connection to a cocking relay. When using this connection, energization and operation of the load control means may take place for smaller values of integrated load than would normally cause operation for similar settings of the coupling and reset control switches.

Another feature of the invention resides in the arrangement of circuits and controls which enable the system to be constructed from switching equipment now available on the market, and without the necessity of making special elements or devices. Furthermore, the system may be extended to provide the wide range of values of integrated load, and relationships of integrated load to elapsed time, which are necessary for such a system to find wide acceptance, by merely adding other commercially obtainable switching equipment or controls.

In the embodiment of the invention illustrated herein the load integrating means comprises a selector switch having contactors adapted to traverse banks of contacts. The extension of the range of this switch is accomplished by the provision of means whereby the switch contactors may traverse their associated banks a plurality of times, the load control means of the system becoming operative optionally during one or another of the traverses of the contactors.

Other features and advantages will hereinafter appear.

In the accompanying drawings—

The system of this invention may be assembled to form a single compact portable device for use with existing metering equipment. It also may be made up with controls adapted to be located at points remote from the device itself. In the event that existing meters in a location are not suited for use with the device, an additional watt-hour meter may be installed for use in conjunction with it.

For the sake of convenience and flexibility, the regulating device when made up as a portable unit, as shown in the drawings, is provided with an eight-connection plug and receptacle 10 and 11 respectively (Fig. 1) through which all external connections to the device are made. The plug 10 and receptacle 11 have leads 12 and 13 for a suitable alternating current supply for instance 115 volts 60 cycles, leads 14, 15 and 16 representing the circuit controlled by the device, and leads 17, 18 and 19 by means of which the device receives impulses from an energized circuit (only partly shown) connected to a standard type of contact-making demand watt-hour meter (not shown).

In its operation the present regulating system utilizes both alternating current for timing purposes, and direct current for the operation of relays and switches, and for this latter purpose a step-down transformer 20 is provided, having its high side connected through a line switch 21 to the alternating current supply leads 12 and 13, and its low side connected to a rectifier 22 which has a positive conductor 23 and negative conductor 24.

From the line switch 21 a pair of conductors 25 and 26 connects to a synchronous timing motor 27 which, when energized, drives a cam 28 controlling contacts 29 to cause the latter to periodically engage and disengage each other. One of the contacts 29 is connected through the conductor 23a to the positive conductor 23 of the rectifier, and the other to a conductor 30 so that the rectifier voltage periodically exists between the conductors 24 and 30. The time interval of the cycle of make-and-break of the contacts 29 may be chosen from any of a number of satisfactory values, but for the purpose of illustration the cycle may be considered to occur once each minute.

Impulses as determined by a multiple-contact demand watt-hour meter, which may be of any type well known in the art, are received by the control system over the conductors 17, 18, and a common lead 19. The impulses occur alternately between the conductors 17 and 19, and 18 and 19, and at a frequency which varies directly with the magnitude of load being measured by the meter. A pair of relays 31 and 32 are connected to the wires 17, 18, and by a jumper 19a to the wire 19 as shown so that each relay responds to only one set of impulses. The relays 31 and 32 have normally open contacts 33 and 34 respectively, connected in parallel by a wire 35 and wires 36 and 37, the latter two being connected through a switch 38. With the switch 38 closed, the wire 37 is connected through the relay contacts to the wire 35 each time an impulse is conveyed over either of the wires 17 or 18, but if the switch 38 be opened, the wires 35 and 37 will be electrically joined only when an impulse is conveyed over the wire 17, these impulses constituting half the total number of impulses conveyed over the common conductor 19. The switch 38 is therefore an impulse doubler switch.

Figure 2:
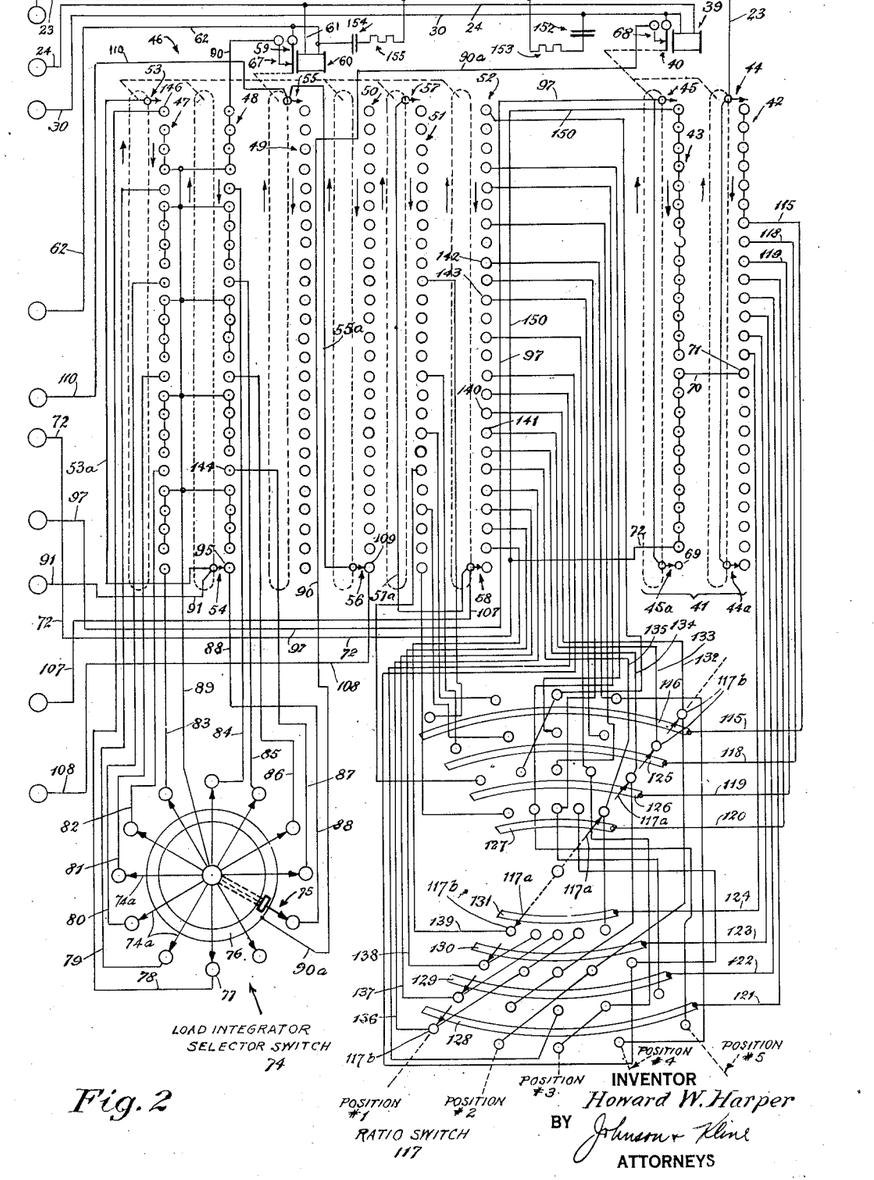

As stated above the system of this invention includes an integrator of time. Hence, as shown in Fig. 2, the wires 24 and 30, receiving impulses controlled by the timing motor 27, are connected to a coil 39 having an armature 40 which, upon responding to the impulses, drives step-by-step through a ratchet mechanism (not shown), a rotary integrator device. This is in the form of a switch 41 which may have two banks of contacts 42 and 43 and mechanically linked pairs of staggered contactors 44, 44a and 45, 45a arranged to respectively traverse said banks. One type of such switch, with coil and operating armature suitable for this purpose, is that manufactured by The American Automatic Electric Co., Chicago, Illinois, and shown in their catalogue #4071-C, page 50 as #RG 46. The pair of staggered contactors 44 and 44a are electrically joined, as are the pair of contactors 45 and 45a.

The intermittent impulses applied to the coil 39 will cause the contactors 44, 44a and 45, 45a to advance step-by-step over the contacts in the banks 42 and 43. Each pair of contacts will dwell for approximately one minute on each contact in its respective bank and will then be quickly moved to the next contact. If the impulses were permitted to continue indefinitely, when the last contact in each bank is reached by one of each pair of contactors 44, 44a and 45, 45a, the other of each pair would reach a position directly ahead of the first contact of the bank, and would on the next impulse engage the first contact to begin the traversing anew.

As thus connected, the switch 41 by successive positions of its contactors, adds or integrates elapsing time, and through the use of a suitable reset mechanism, the switch 41 may be made to operate according to predetermined cycles occurring consecutively, each of definite time length or duration. According to the present invention, energy consumable within desired limits is apportioned with respect to these cycles. A convenient time for the cycle would be fifteen minutes each, since commercial rates based on minimum and maximum demand are frequently considered with respect to such intervals.

For the purpose of regulating a consumer's energy consumption during each such fifteen minute interval to avoid exceeding the desired maximum, the present invention provides a load integrator responding to the impulses received over the conductors 17, 18 and 19, illustrated diagrammatically as a rotary selector switch 46 (Fig. 2) which may have six banks of contacts 47, 48, 49, 50, 51 and 52, and contactors 53, 54, 55, 56, 57 and 58 for said banks respectively. A switch suitable for this use is that marked #RG 89, page 51 of The Automatic Electric Co. catalogue mentioned above.

All the contactors for the switch 46 are mechanically joined to move in unison, and are driven through a ratchet (not shown) and an armature 59 associated with a coil 60. As shown in Fig. 2, the contactors 53 and 54 are connected together electrically, as indicated by a conductor 53a. The banks of contacts 47 and 48 occupy a semicircle, and the contactors 53 and 54 are displaced 180° with respect to each other; hence when one contactor is traversing its associated bank, the other contactor is returning idly from the last contact of its bank to the first contact thereof. As a result, the banks 47 and 48, shown as each having twenty-five contacts, function the same as would a single group of fifty circularly and consecutively arranged contacts traversed by a single contactor, the last contact of such group being directly adjacent the first contact.

The banks 49 and 50, and banks 51 and 52, together with their respective contactors are similarly arranged, the contactors 55 and 56 being connected by a conductor 55a, and the contactors 57 and 58 by a conductor 57a. However, it should be noted that the banks 42 and 43 of the time integrator switch 41 operate as individual groups, since the contactors in each pair 44, 44a and 45, 45a of this switch traverse only one bank. The pairs of contactors, while mechanically coupled, are electrically insulated from each other.

One end of the operating coil 60 of the local integrating switch 46 is connected by a wire 61 to the negative wire 24 of the rectifier, and the positive connection for the other end is through a wire 62 joined to the wire 37 (Fig. 1) of the load impulse relays 31 and 32.

The intermittent energization of the conductor 37 through contacts 33 and 34 is accomplished through the feed wire 35, and is under the control of a reset relay 63. The purpose of this relay is to provide for resetting of the rotary integrator switches 41 and 46 to initial starting position at periodic intervals as, for instance, fifteen minute periods, and to nullify during this resetting the effect of the load impulses in the leads 17, 18 on the integrator switch 46. Accordingly, the feed wire 35 is connected by a wire 64 to a reset relay contact 65 normally engaged by a contactor 66 connected through a wire 23b to the positive conductor 23 of the rectifier. As thus connected, the feed wire 35 is normally energized from the positive side of the rectifier 22, and as a result the load impulses in the wires 17, 18 and 19, through operation of the relays 31 and 32, will cause intermittent energization of the coil 60 of the load integrator switch 46. The contactors 53, 54, 55, 56, 57 and 58 of this switch will traverse their respective contact banks step-by-step under impulses from the demand meter circuit which are transmitted as the energy is consumed, the total number of steps of the contactors representing the total amount of energy consumed.

Use is made of the integrating function of the switch 46 to control the consumers load according to a predetermined plan based on relationships between the switch 46 and switch 41 over the fifteen-minute reckoning time, after which both switches may be automatically returned to their initial starting positions for continued repetition of the cycle.

As the switches 41 and 46 are connected, as thus far described, the contactors of both would continue to advance step-by-step indefinitely. For the purpose of driving the switches for resetting before they begin their new cycle of operation, use is made of contacts 67 and 68 associated with the driving armatures of the switches. These contacts, engaging the armatures 59 and 40 respectively, are so arranged that when they are connected to the proper source of energy the armatures may be rapidly pulsated independently of the integrating pulses, to cause a rapid rotation of the contactors to their initial or starting positions.

Also, according to the present invention, means are provided for changing the starting position to which the switch 46 will return preparatory to beginning its new cycle. Thus the value of the total energy entering into the relationship between the switches 41 and 46 may be varied according to the position to which the switch 46 is reset. Referring to Fig. 2, the banks of contacts 47 and 48 of the switch 46, and the bank of contacts 43 of the switch 41 are used for resetting purposes.

The time integrating switch 41 initiates the reset operation of both switches, and therefore determines the starting of a new cycle of operations periodically, say every fifteen minutes. Thus, beginning at a starting position as shown in Fig. 2, when the contactors 44, 44a and 45, 45a are moved fifteen steps, resetting of both switches takes place. During this movement the contactors 44 and 45, after the first minute of operation, each engage each of the first fourteen contacts in its associated bank for one minute apiece.

It is understood, of course, that during this fifteen minute period the contactors of the switch 46 are being advanced in response to the load impulses received over the conductors 17, 18 and 19, so that when the resetting begins, the switch 46 is not in its initial or starting position.

In accomplishing this resetting of the switches, all of the contacts beyond the fourteenth in the bank 43 of the switch 41, with the exception of the last contact 69, are connected together, and connected by a wire 70 to the fifteenth contact 71 of the bank 42. The pair of contactors 44 and 44a are connected to the positive feed line 23. A wire 72 connects the joined contacts of the bank 43 to one end of the coil of the reset relay 63 (Fig. 1), the other end of the coil being connected by a wire 73 to a conductor 24a joined to the negative feed line 24.

Thus when the contactor 44 of the switch 41 reaches the fifteenth contact 71, it immediately energizes the reset relay 63. It will be noted that this, by separating the contactor 66 of the relay from the contact 65, isolates the wire 64 from the positive line 23b and renders inoperative the circuit through the contacts of the load impulse relays 31 and 32, so that the coil 60 of the switch 46 (Fig. 2) does not now further respond to load impulses.

For adjustably controlling the reset position of the rotary switch 46, a twelve-point fan blade switch 74 (Fig. 2) is provided having twelve blades mechanically connected together, eleven of the blades, numbered 74a, being electrically joined together, and the twelfth blade, marked 75, being insulated from the other eleven. The blade 75 bears on a collector ring 76 by means of which connection to the external circuit is accomplished.

Starting with the contact 77 and progressing in a clockwise direction around the switch 74, the first eleven contacts are respectively connected to the first, fifth and every succeeding fifth contact to the fiftieth, of the group comprising the banks 47 and 48 of the switch 46 by means of conductors 78 to 83 inclusive, respectively. All the other contacts of these two banks are connected together, and to a common wire 89 leading to the eleven electrically-joined fan blades of the switch 74. Also, a wire 90 connects from the first contact of the bank 48 to the contact 67 associated with the driving armature 59 of the switch 46.

The collector ring 76 of the fan blade switch 74 is connected by a conductor 90a to the contact 68 of the armature 40 for moving the rotary switch 41, and this armature is connected to the wire 30 as shown.

To complete the reset circuit, the contactors 53 and 54 of the switch 46 are connected by a wire 91 to a normally disengaged contact 92 (Fig. 1) of the reset relay 63, and an associated contactor 93 of the relay is joined by a conductor 94 to the conductor 72.

Thus, when the reset relay 63 is energized at the end of fifteen minutes, the coil 60 of the integrator switch 46, being now unresponsive to load impulses received over the conductors 17, 18 and 19, will be energized through the contact 67 and armature 59 from the positive side of the rectifier circuit in the following manner: At the instant the reset relay 63 becomes energized, the contactors of the switch 46, having been advanced by the load impulses, are in some position other than that from which they started. As a result, the contactors 53 and 54, which are connected to the wire 91, are either directly connected through the network of interconnected contacts of the banks 47 and 48 to the wire 90 and armature contact 67, or are indirectly connected to these latter through the medium of the fan blades of the switch 74 and the wire 89.

In either case, the contact 67 and armature 59 will be energized from the positive side of the rectifier through the wire 91, contact 92 and contactor 93 of the reset relay 63 (Fig. 1), wires 94, wire 72 (follow through Fig. 2) to the interconnected remaining contacts of the bank 43 of the switch 41, and through the wire 70 to the contactor 44 (now on contact 71) which joins the positive lead 23 of the rectifier.

The contactor 44 of the switch 41 would remain on the fifteenth contact 71 for practically a full minute insofar as the timing impulses controlled by the timing motor 27 are concerned. However, at the very beginning of this minute, the reset relay is energized, and then the coil 60 of the selector switch 46 energized through the contact 67 and armature 59. This immediately causes resetting of the contactors of the switch 46 to the position shown in Fig. 2, the action of the contact 67, resulting vibration of the armature 59, and ratchet drive (not shown) for the contactors being known in the art in connection with the specific make of switch as identified above. The contactors 53 and 54 reach their initial or starting positions in a matter of a few seconds, and upon their doing so the circuit from the positively charged wire 91 to the wire 90 and contact 67 is broken, so that the coil 60 of the switch 46 is no longer energized.

The contactors 53 and 54, however, do not immediately begin to advance again because the impulses from the impulse relays 31 and 32 are still not carried to the coil due to the reset relays 63 still being energized. As the positively charged contactor 54 resets on the fiftieth contact 95 of the group comprising the banks 47 and 48, it energizes the wire 88, the insulated blade 75 of the fan blade switch 74, the collector ring 76, and wire 90a connected with the contact 68 and armature 40 of the switch 41. The armature 40 being connected to the wire 30 and therefore to one end of the coil 39 causes a circuit to be completed through this coil, which now immediately proceeds to vibrate the armature for resetting the contactors 44, 44a and 45, 45a of the switch 41.

Figure 1:
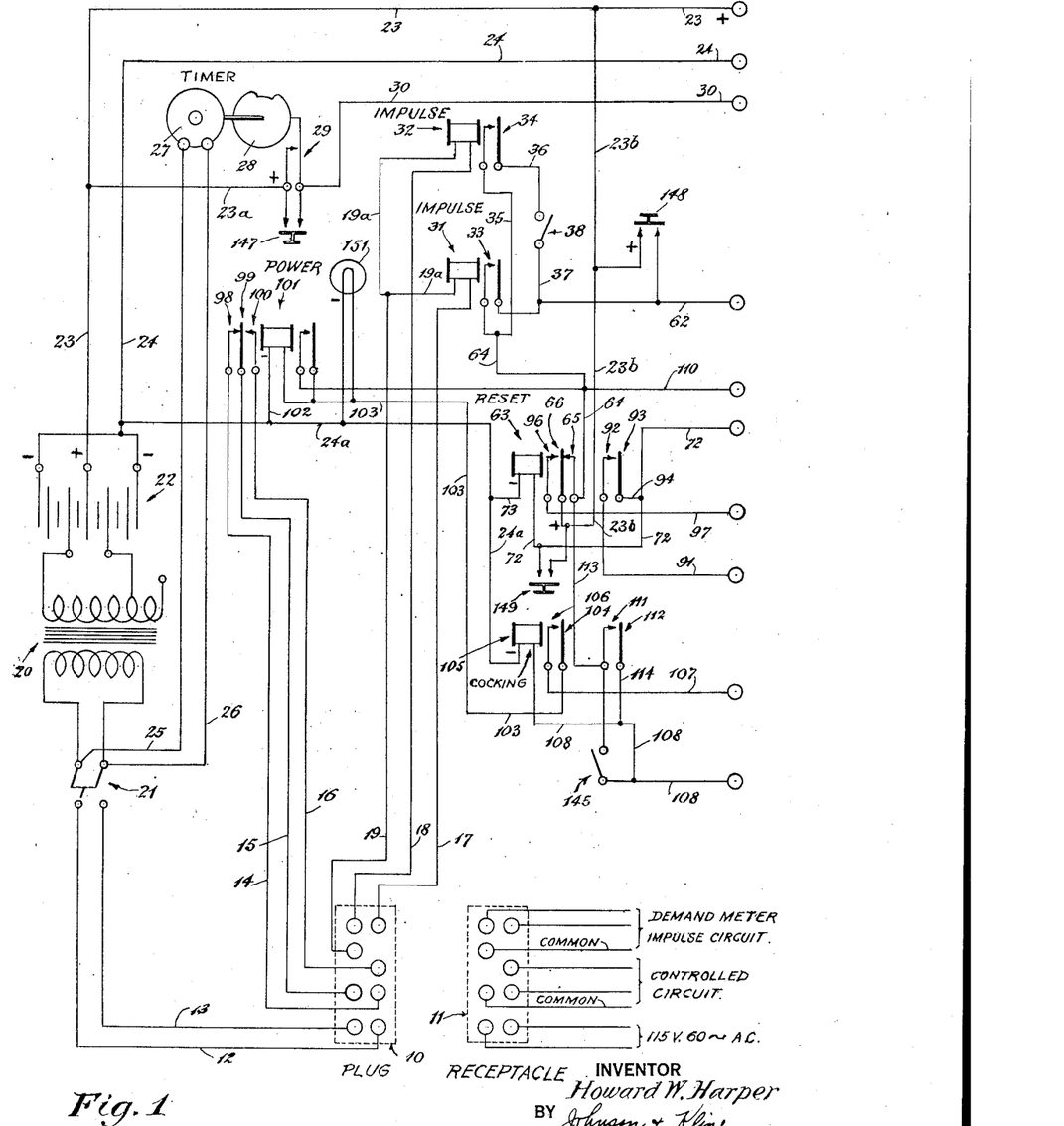
Figures 1 and 2 combined depict diagrammatically the regulating system embodying the invention.

When the contactor 44 of the switch 41 leaves the fifteenth contact 71 of the bank 42, energization of the coil 39 is maintained in the following manner: Referring to Fig. 1, the contactor 66 of the reset relay 63, which is connected by the conductor 23b to the positive line 23 of the rectifier, engages a contact 96 connected to a wire 97 which is in turn connected to the pair of contactors 45 and 45a of the switch 41. Therefore, when the contactor 44 of the switch leaves the fifteenth contact 71 (Fig. 2), the contactor 45, now positively energized, begins to traverse the interconnected fifteenth to twenty-fourth contacts of the bank 43 and thus maintains positive polarity on the wire 72 which (Fig. 1) maintains the energization of the reset relay 63, and also maintains the positive polarity of the wire 94, contacts 92 and 93, wire 91, contactor 54 of switch 46 (Fig. 2), wire 88, insulated contact blade 75 of the fan blade switch 74, and wire 90a, contact 68, armature 40 and end of the coil 39.

This causes the contactors 44, 44a and 45, 45a of the switch 41 to be rapidly advanced within the matter of a few seconds, until the contactor 45 reaches the last or twenty-fifth contact 69 of the bank 43. This immediately breaks the circuit between the positively charged pair of contactors 45, 45a and the wire 72, so that the latter becomes dead.

In consequence the reset relay 63 is deenergized, together with the driving coil 39. This coil was depending for its positive connection upon the wire 90a, ring 76 and blade 75 of the fan blade switch 74, wire 88, contactor 54, wire 91, contacts 92 and 93 and wire 94 which latter is joined to the wire 72.

Deenergization of the reset relay 63 immediately reconnects the conductor 64 with the positive conductor 23b so that load impulses received over the wires 17, 18 and 19 will again cause intermittent energization of the coil 60 of the integrating switch 46, and functioning of the latter for integrating energy during the new fifteen minute cycle of operation.

It will be noted that when the switch 41 is in its reset or new beginning position, the contactors 45 and 45a, and the contactors 44 and 44a thereof have exchanged positions. Operation of the switch is the same during the next cycle, however, as that just described.

The total time required for resetting of the switches 46 and 41 is only a few seconds, so that the next timing impulse received by the coil 39 of the switch 41 does not interfere with the resetting, but finds the switch in its new position already starting a new cycle.

Referring to the functioning of the fan blade switch 74, it will be noted that the halting of the resetting movement of the integrating switch 46 occurs whenever either of the contactors 53 or 54 of this switch strikes a contact which isolates them from the wire 90 connected with the contact 67 and armature 59. The isolation of any one of the first, fifth, tenth, etc. contacts of the banks 47 and 48 from the wires 89 and 90 is predetermined by the setting of the fan blade switch 74. By the same operation, the contact so isolated is connected by the contactor 75 to the slip ring 76 and wire 90a leading to the contact 68 of the coil 39 to start the resetting of the integrator switch 42.

As shown in Fig. 2, the fiftieth contact 95 of the switch 46 is isolated from the wires 89 and 90. By changing the setting of the fan blade switch, which may be done by hand, the integrating switch 46 may thus be made to reset to any of eleven different positions indicative of eleven different energy-totals, and therefore this switch will start integrating energy from any of these positions.

Referring to Fig. 1, the controlled circuit through the plug 10 and receptacle 11 for regulating the loading to which the demand meter responds is represented by the wires 14, 15, and 16.

The terminals of the receptacle 11 corresponding to these conductors may be connected to switch off in a manner well understood, and therefore not shown in the drawings, either directly or through relays whatever equipment a consumer has which might be made temporarily inoperative without undue inconvenience or hardship to the consumer. This would occur if the consumers loading at some time during the fifteen minute period indicates that continuance of this loading for the remainder of the period would result in the maximum stipulated demand being exceeded.

The wires 14, 15 and 16 are connected respectively to a normally closed contact 98, a contactor 99 and a normally open contact 100 of a power relay 101. The coil of the relay 101 has one end connected through a wire 102 to the negative wire 24a of the rectifier, and the other end connected by a wire 103 to a normally open contactor 104 of a cocking relay 105 which functions as an automatic switch for the relay 101. Associated with the contactor 104 is a contact 106 connected to a wire 107 which when connected to a positive line will operate the power relay 101 once the cocking relay 105 is energized.

Energization of the relay 105 is under the control of the contactors 55 and 56, and banks of contacts 49 and 50 of the switch 46. The connections for effecting this are as follows: One end of the coil of the cocking relay 105 is connected to the negative line 24a from the rectifier. The other end is connected to a wire 108 which (Fig. 2) in turn connects with the fiftieth contact 109 of the group comprising the banks 49 and 50. The contactors 55 and 56 of this group, which function as a single contactor, are connected by a wire 110 which (Fig. 1) connects to the conductor 64 which is positively energized at all times except when the reset relay 63 is energized.

Thus each time the integrating switches 46 and 41 are returned to their initial starting positions as shown in Fig. 2 the cocking relay will be energized by virtue of the contactor 56 of the switch 46 engaging the fiftieth contact 109, since, immediately after reset, the reset relay 63 is deenergized.

Once the cocking relay 105 is energized, its energization is maintained until energization of the reset relay 63 takes place. After this latter occurs, the cocking relay must again be energized by the contactor 56. Maintenance of energization of the cocking relay is accomplished by the provision of a pair of auxiliary normally open contacts 111 and 112 operated by the relay and connected respectively by wires 113 and 114 to the normally positive contact 65 of the reset relay 63 and the wire 108 for the coil of the cocking relay.

It will be noted that should the fan-blade switch 74 be set to some other position, the integrating switch 46 will in resetting return to a starting position other than that shown in Fig. 2, and therefore the cocking relay 105 will not be immediately energized. This delayed energization of the cocking relay serves as a useful function as will be later brought out, it being understood for the present that for a condition such as this if the contactors of the switch 46 are advanced in response to heavy loading the contactor 56 will at some time before the expiration of the fifteen minute interval constituting the cycle of operation, engage the contact 109 to energize the cocking relay so that operation of the power relay 101 is made possible.

According to the present invention the operation of the power relay 101 to control the loading is dependent on the attainment of predetermined relationships between the energy integrating switch 46 and the time integrating switch 41. Such relationships would be representative of definite maximum amounts of energy consumed in definite intervals of time within the reset cycle of the switches, and a consumers loading could thus be automatically controlled so that during any such cycle the total energy consumed would not exceed a stated maximum demand. Broadly stated the contacts of the energy integrating switch and time integrating switch are electrically interconnected so that if a prededetermined relationship is reached, the interconnected contacts are simultaneously engaged by the contactors, and the power control relay 101 is energized to reduce the load.

In the broader aspects of the invention these relationships might be once predetermined and then fixed. However, in the embodiment of the invention illustrated and described herein, means are provided for adjusting and varying the relationships to meet a wide variety of conditions.

One such means is the fan blade switch 74 already described. This provides for resetting of the integrator switch 46 to any of various starting positions, thus changing the starting or reset relationship between the switches 46 and 41. As a result a wide number of total values of consumed energy, taken with respect to the time intervals blocked off by the switch 41, is made possible.

The relationships, exclusive of starting positions, between the switches 46 and 41 are determined through the medium of the electrical connections between the bank of contacts 42 of switch 41 and the banks of contacts 51 and 52 of the switch 46, and a means for adjusting or varying these connections is provided by a multi-blade selector switch 117.

Referring to Fig. 2, the first seven contacts of the bank 42 of the switch 41 are connected together and joined by a coupling wire 115 to a contactor segment 116 of a multi-blade selector switch 117. Also, the eighth to fourteenth contacts of the bank 42 are respectively connected by conductors 118 to 124 inclusive to segments 125 to 131 inclusive of the switch 117. When the contactors of the switch 117 are in their #1 position, as shown in Fig. 2, the segments 116 and 125 through 131 are respectively connected to switch contacts 117b in turn connected to coupling wires 132, 133, 134, 135, 136, 137, 138 and 139 which are joined respectively to the forty-second through the forty-ninth contacts of the group comprising the banks 51 and 52 of the switch 46.

The switch 117, which I term a ratio switch because it varies the ratio between time intervals and load increments, has, as shown, five positions, and five sets of contacts to be selectively engaged by the switch contactors 117a riding on the segments, and further connections are made between each set of contacts, and between the sets and the banks 51 and 52 of the switch 46 so that the following circuits may be formed: For position number two, the first seven as a group, and the eighth through fourteenth contacts individually of switch 41 connect respectively with every other contact between and including the thirty-fourth and forty-eighth of the group comprising the banks 51 and 52 of the switch 46; for position number three, every third contact between and including the twenty-sixth and forty-seventh of the group of switch 46; for position number four, every fourth contact between and including the eighteenth and forty-sixth of switch 46; and for position number five, every fifth contact between and including the tenth and forty-fifth of switch 46.

Now, in following through wire 107 from Fig. 1, it will be observed that this, in Fig. 2, connects with the contactors 57 and 58 associated with the banks 51 and 52 of switch 46. Whenever the contactor 44 (of switch 41) connected with the positive side of the rectifier, is connected by means of the coupling circuits through the ratio switch 117 to the contactors 57 and 58 of the switch 46 it will cause operation of the power relay 101 provided the cocking relay has been first energized.

Thus, if during any cycle of operation of the switches 46 and 41, the energy being integrated by the switch 46 exceeds any of a plurality of predetermined total values respectively in a corresponding plurality of time intervals as determined by the settings of the switches 74 and 117, the portion of the load connected with the controlled circuit of the power relay 101 may be disconnected for the remainder of the cycle.

The operation of the regulating system as a unit is as follows: With the switches 21 and 38 closed, and the switches 74 and 117 in the positions shown, the cocking relay 105 will be energized, and timing impulses as determined by the timer 27, and occurring at one minute intervals, will advance the time integrating switch 41 a step after each minute, including the first. Also, load impulses received over the wires 17, 18 and 19 will advance the energy integrating switch 46 step-by-step.

If at any time before the beginning of the eighth minute of operation, the consumers loading is so heavy that, in the switch 46, the contactor 57 traverses the entire bank 51 and the contactor 58 then traverses the bank 52 to or past the forty-second contact 140 of the group comprising both banks, the power relay 101 will be operated to disconnect a part of the consumers load. This operation of the relay 101 is an indication that the consumers loading before the first eight minutes of operation of the device has been too heavy to allow it to continue at the same rate.

During the remaining seven minutes left in the fifteen-minute cycle, the power relay 101 will remain energized so that the loading will continue at a reduced rate necessary to keep the total energy consumed during the fifteen-minute interval below the maximum stipulated demand. At the expiration of the fifteen minutes, the integrating switches of the device will reset and the power relay will be deenergized so that the consumers equipment which was disconnected will again be connected.

If, however, before the first eight minutes of operation of the device the consumers loading was not heavy enough to cause the contactor 58 to pass the forty-second contact 140, then the loading was not for these eight minutes, at an average rate which if continued would cause the maximum energy consumption during the fifteen-minute interval to exceed the stipulated demand, and power relay 101 would not be energized nor the consumers loading reduced.

If the loading is not reduced by the device before the first eight minutes of its operation, and if during the ninth minute the contactor 58 were to move past the forty-third contact 141 of the group comprising the banks 51 and 52, the power relay 101 would then be operated to reduce the load, and for the remaining minutes of the cycle the consumers loading would be at the reduced rate to prevent his demand from exceeding the maximum. In the event that, during the ninth minute of operation of the device, the contactor 58 did not move past the forty-third contact, then the power reducing relay would not be operated. In like manner the operation of the device during the remaining six minutes would proceed according to this plan of control, as effected by the remaining five coupled contacts in the bank 52 of the switch 46.

When the contactors 57 and 58 of the integrating switch 46 reach any given contact of the group of fifty comprising the banks 51 and 52, it means that a certain amount of energy has been consumed by the consumers equipment. This energy is matched against the time intervals blocked off by the switch 41 to determine whether or not the loading must be altered. With the switches 74 and 117 in the position shown in Fig. 2, upon the contactor 58 reaching the forty-second contact 140, a certain number of watt-hours of energy have been consumed, and this has been matched with a time interval of approximately eight minutes. If it is desired that this amount of energy be matched with a time interval of twelve instead of eight minutes, it is only necessary to move the switch 117 to position #2. This connects conductor 121, corresponding to twelve minutes, through the switch 117 to conductor 132 which joins the forty-second contact 140. When this is done, a smaller amount of energy, as represented by the thirty-fourth contact 142 of the group comprising the banks 51 and 52 is matched with the eight-minute interval, and an intermediate amount of energy represented by the thirty-sixth contact 143 is matched with the nine-minute interval, etc.

It will thus be seen that various ratios or combinations of energy to time intervals may be had by changing the position of the ratio switch 117.

Still further ratios of energy to time are possible by changing the setting of the fan blade switch 74. For instance, if the blades of this switch were to be rotated counterclockwise one-twelfth of a revolution from the position of Fig. 2, so that the insulated blade 75 thereof connected with the contact joined to the conductor 87, the reset position of all the contactors of the energy integrating switch 46 would be changed, and the contactor 54 thereof would come to rest on the forty-fifth contact 144 of the group comprising the banks 47 and 48. Thus, this integrating switch would then have to be moved five steps by the load before the cocking relay 105 became energized, and this is equivalent to adding the amount of energy represented by these five steps to the increments of energy value matched against the increments of time as explained above.

In the same manner the switch 74 may be reset to add, to these previously considered amounts of energy, increments represented by ten steps, fifteen steps, twenty steps, etc. up to fifty steps.

Under certain conditions, especially where the contactors of the integrating switch 46 reset to the lower-numbered contacts of the group comprising the pair of banks, it may be desirable to energize the cocking relay 105 immediately upon reset, and for this purpose there is provided a cocking switch 145 (Fig. 1) connected in parallel with the holding contacts 111 and 112 of the relay. When the switch 145 is closed the cocking relay 105 is energized at all times except during resetting of the integrating switches.

It will be seen that the relationships of energy consumed to time intervals are thus controlled not only by the ratio switch 117 but also by the fan blade switch 74, and the cocking switch 145.

It should be noted at this point that if the fan blade switch 74 is set so that the insulated blade 75 thereof is engaging the contact 77 the energy integrating switch 46 will reset to a position where the contactor 53 is engaging the number one contact 146 of the group comprising the banks 47 and 48. For this setting, the switch 46 will have to be moved forty-nine steps before the cocking relay 105 is energized to make the power relay 101 responsive to the relationships between the switches 46 and 41. Therefore, the contactors 57 and 58 of the switch 46 would transverse the entire lengths of their respective banks once before the power relay 101 would be connected for operation. Upon traversing these banks a second time, however, during which period the cocking relay 105 is energized, the contactors 57 and 58 would cause operation of the power relay 101 should the loading exceed a predetermined maximum average.

The relationships of energy to time between the switches 46 and 41 may be also varied by means of the doubler switch 38. When this switch is closed, each impulse received over the conductors 17, 18 and 19 will cause the integrating switch 46 to advance one step. However, if the doubler switch 38 is open, the integrating switch 46 will advance one step in response to only every other impulse sent over the wires 17, 18 and 19. That is, the switch 46 will advance only when an impulse is received over wires 17 and 19, thus cutting in half the rate of integration of the integrating means. As a result, a completely new set of relationships of energy to time, to accommodate the consumers needs, are possible through the use of the doubler switch 38.

Referring to Fig. 1, for testing purposes during servicing of the device, there is provided a push button 147 connected in parallel with the timing impulse contacts 29 to permit manual step-by-step operation of the time integrating switch 41. Also, a push button 148 is provided connected to the wires 23b and 62 to provide for manual step-by-step operation of the energy integrating switch 46.

A third testing push button 149 is provided, connected with the conductors 72 and 23b to provide for energization of the reset relay 63 when it is desired to reset the integrating switches 46 and 41. In order that this reset may be done at any time, as for instance when the contactors of the switch 41 are engaging a contact between the first and the fourteenth inclusive of their respective banks, the first fourteen contacts of the bank 43 are connected together and connected by a wire 150 to the wire 72. Thus, operation of the push button 149 will, by energizing the reset relay 63, cause the wire 97, and therefore the contactors 45 and 45a of switch 41 (Fig. 2) to be connected through wires 23b and 23 to the positive side of the rectifier. This will cause the wires 150 and 72 connected with the bank 43 of the switch to become positive, and (Fig. 1) will maintain the energization of the relay 63 until the switches have reset.

A pilot light 151 is connected to the wires 103 and 24a respectively to indicate visually when the loading is reduced by the device.

For the purpose of reducing sparking at the armature contacts of the integrating switches (Fig. 2), a condenser 152 and resistor 153 are connected in series, and joined to the conductors 30 and 23 respectively, and a condenser 154 and resistor 155 connected in series and joined to the conductors 62 and 23 respectively.

Variations and modifications may be made within the scope of this invention and portions of the improvements may be used without others.

I claim:

1. In a load regulating system, integrating means responsive to a variable load; integrating means responsive to the elapse of time; means for altering said load when a predetermined relationship is reached between both said integrating means; and means coupled to both said integrating means for changing said load-altering relationship between said integrating means.

2. In a load regulating system, means responsive to energy consumed; means responsive to the elapse of time; means controlled by both said means and operative after the elapse of an initial predetermined period of time for altering the energy consumption when a predetermined ratio of energy to elapsed time is reached; and separate means controlled by the energy responsive means for altering said energy consumption whenever a predetermined amount of energy is consumed within said initial period of time.

3. In a load regulating system, integrating means responsive to a variable load; integrating means responsive to the elapse of time; means operative after a predetermined elapse of time for altering said load when a predetermined ratio of energy to total elapsed time is reached between both said integrating means; and means coupled to both said integrating means for changing said load-altering ratio between said integrating means.

4. In a load regulating system, integrating means responsive to a variable load; integrating means responsive to the elapse of time; means for altering said load when a predetermined relationship between said integrating means based on apportionment of a maximum integrated load value over a predetermined period of time is reached; and means independent of said load and coupled to both said integrating means for changing the maximum integrated load value upon which said apportionment is based.

5. In a load regulating system, integrating means responsive to a variable load; integrating means responsive to the elapse of time; means for altering said load when a predetermined ratio, between both said integrating means, of energy to elapsed time based on apportionment of a maximum integrated load over a predetermined period of time is reached; means coupled to both said integrating means for changing said load-altering ratio between said integrating means; and means coupled to both said integrating means for changing the maximum integrated load upon which said apportionment is based.

6. In a load regulating system, integrating means responsive to a variable load; integrating means responsive to the elapse of time; means for altering said load when a predetermined relationship is reached between both said integrating means; and means for changing said load-altering relationship between said integrating means to a new predetermined relationship while the device is in operation.

7. In a load regulating system, integrating means responsive to a variable load; circuit means connected therewith; integrating means responsive to the elapse of time; circuit means connected therewith; means controlled by said circuit means for altering said load when a predetermined relationship is reached between both said integrating means; and means for variably interconnecting said circuit means for changing said load-altering relationship between said integrating means.

8. In a load regulating system, integrating means responsive to a variable load; electrical conductors connected therewith; integrating means responsive to the elapse of time; electrical conductors connected therewith; means controlled by said conductors for altering said load when a predetermined relationship is reached between both said integrating means; and switch means connected with said electrical conductors for changing said load-altering relationship between said integrating means.

9. In a load regulating system, integrating means responsive to a variable load; integrating means responsive to the elapse of time; means connected with both said integrating means for altering said load if a predetermined amount of energy is consumed before the elapse of a predetermined interval of time; and separate means coupled to both said integrating means for changing the amount of said predetermined energy.

10. In a load regulating system, integrating means responsive to a variable load; integrating means responsive to the elapse of time; means connected with both said integrating means for altering said load if a predetermined amount of energy is consumed before the elapse of a predetermined interval of time; and means including a plurality of selectable contacts coupled to both said integrating means for changing the length of said predetermined interval of time corresponding to said predetermined amount of energy.

11. In a load regulating system, integrating means responsive to a variable load; integrating means responsive to the elapse of time; means connected with both said integrating means for altering said load if a predetermined amount of energy is consumed before the elapse of a predetermined interval of time; means coupled to both said integrating means for changing the amount of said predetermined energy; and means including a plurality of selectable contacts coupled to said integrating means for changing the length of said predetermined interval of time corresponding to said predetermined amount of energy.

12. In a load regulating system, integrating means responsive to a variable load; integrating means responsive step-by-step to the elapse of time, each of said steps corresponding to a uniform time interval; and means for altering said load when a predetermined ratio between said integrating means of energy to steps of time is reached.

13. In a load regulating system, an automatic powered timing switch having a plurality of insulated contact points and a contactor adapted to connect selectively to said points and operating to periodically connect to the latter in rotation according to a predetermined timing; a powered metering switch and control circuits therefor controlled by the timing switch to automatically reset the metering switch to open-circuit position periodically in step with the cycle of the timing switch, said metering switch having a plurality of insulated contact points and a contactor adapted to connect selectively to said points and operating to engage the latter consecutively at a speed proportional to the rate of energy consumption in a circuit; and means connected with the contact points of the switches for altering the load of the circuit consuming said energy when a predetermined relationship is reached between the contactors of said switches.

14. In a load regulating system, integrating means responsive to a variable load; integrating means responsive to the elapse of time; means for automatically beginning a new cycle of operations of the said integrating means at the expiration of a predetermined period of time, said integrating means having a predetermined starting relationship with each other; means for altering the load when an advanced predetermined relationship is reached between both said integrating means; and means connected with said means for beginning a new cycle of operations for changing the predetermined starting relationship between said integrating means.

15. In a load regulating system, integrating means responsive to a variable load; integrating means responsive to the elapse of time; means for altering an electric load; means connected with said integrating means for controlling said load altering means if an amount of energy of predetermined value is consumed before the elapse of one predetermined interval of time; and separate means connected with said integrating means and operative only if the preceding controlling means is not caused to function for controlling said load-altering means when the amount of energy consumed reaches another and greater predetermined value in a predetermined longer interval of time.

16. The invention as defined in claim 15 in which there are means for changing the length of the predetermined intervals of time in which said predetermined values of energy must be consumed to cause the load altering means to be operated.

17. The invention as defined in claim 15 in which there are means for changing the values of energy at which in either time interval the load altering means is caused to operate.

18. The invention as defined in claim 15 in which there are means for changing said predetermined intervals of time, and said predetermined amounts of energy.

19. In a load regulating system, integrating means responsive to a variable load; integrating means responsive to the elapse of time; means for automatically beginning a new cycle of operations of the said integrating means at the expiration of a predetermined period of time; means for altering said load when the first to be reached of any of a plurality of fixed predetermined consecutive relationships obtains between both said integrating means; and means for limiting the operation of said load-altering means to once in each cycle of operation of said integrating means.

20. In a load regulating system, integrating means responsive step-by-step to energy consumption; integrating means responsive step-by-step to the elapse of time; means for altering the rate of energy consumption when a predetermined total of steps of the energy integrating means, representing energy consumed, is reached before a predetermined total of steps of the time integrating means, representing elapsed time, is reached; and means for altering the rate of response of one of said integrating means whereby the means for altering the rate of energy consumption is caused to function in response to a different relationship between energy consumed and time of consumption without changing the relationship between the predetermined totals of steps of the integrating means.

21. In a load regulating system, integrating means responsive to the elapse of time; a powered metering switch having a plurality of insulated contact points and a contactor adapted to connect selectively to said points and traversing the latter a plurality of times in rotation from a given starting point at a speed proportional to the loading in a circuit; means connected with the contact points of the metering switch and with the integrating means for altering said loading if the contactor during its first traverse engages a predetermined one of said points before the elapse of a predetermined period of time; and means for causing said load altering means to be inoperative during the first traverse of said contactor.

22. The invention as defined in claim 15 in which there are means for changing by a fixed percentage the values of energy at which in either time interval the load-altering means is caused to operate.

23. The invention as defined in claim 15 in which there are means for changing, each by a different percentage, the individual values of energy at which in either time interval the load-altering means is caused to operate.

24. The invention as defined in claim 15 in which there are means for changing, each by a different percentage, the lengths of the individual predetermined intervals of time in which said predetermined values of energy must be consumed to cause the load altering means to be operated.

25. In a load regulating system, means responsive to energy consumed; means responsive to the elapse of time; means controlled by both said means for altering the energy consumption if a predetermined amount of energy is consumed before the elapse of a predetermined interval of time; means controlled by the time-responsive means for returning the energy-responsive means to a starting condition after the elapse of a greater predetermined interval of time; means controlled by the energy-responsive means and operative upon completion of return of same to starting condition for returning the time-responsive means to a starting condition; and means for preventing response to energy consumption of the energy-responsive means during return of the time-responsive means.

26. The invention as defined in claim 13 in which there are means connected with the contact points of the switches for changing said relationship, said means including a multi-blade selector switch having a plurality of positions each of which represents a different load-altering relationship between the contactors of the powered switches whereby said load alteration will be effected when any one of said relationships, as determined by the setting of the multi-blade switch is reached.

27. In a system of the character described, load-controlling means; and energy integrating means including apparatus having an adjustable inactive cycle and a succeeding active cycle operative to control said load-controlling means.

28. The invention as defined in claim 13 in which the metering switch has a plurality of open-circuit positions, and in which there are means, including a selector switch connected with the contact points of the metering switch, for changing the reset position of the latter as determined by the setting of the selector switch.

HOWARD W. HARPER.

REFERENCES CITED

The following references are of record in the file of this patent:

UNITED STATES PATENTS

| Number | Name | Date |
|---|---|---|
| 1,673,116 | Jenkins | June 12, 1928 |
| 1,904,500 | Mclenegan | Apr. 18, 1933 |
| 1,959,166 | Kaufman | May 15, 1934 |
| 1,999,810 | Hershey | Apr. 30, 1935 |
| 2,384,792 | Brown | Sept. 18, 1945 |